(12) United States Patent
Tsukamoto et al.

(10) Patent No.: US 11,494,704 B2
(45) Date of Patent: Nov. 8, 2022

(54) INFORMATION PROCESSING METHOD AND INFORMATION PROCESSING SYSTEM

(71) Applicant: Panasonic Intellectual Property Corporation of America, Torrance, CA (US)

(72) Inventors: Yusuke Tsukamoto, Osaka (JP); Kazunobu Ishikawa, Osaka (JP); Sotaro Tsukizawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 299 days.

(21) Appl. No.: 16/929,541

(22) Filed: Jul. 15, 2020

(65) Prior Publication Data

US 2021/0019666 A1    Jan. 21, 2021

Related U.S. Application Data

(60) Provisional application No. 62/876,137, filed on Jul. 19, 2019.

(30) Foreign Application Priority Data

Feb. 28, 2020 (JP) .............................. JP2020-033062

(51) Int. Cl.
*G06N 20/20* (2019.01)
*G06K 9/62* (2022.01)
*G06V 10/98* (2022.01)

(52) U.S. Cl.
CPC ........... *G06N 20/20* (2019.01); *G06K 9/6256* (2013.01); *G06K 9/6261* (2013.01); *G06V 10/98* (2022.01)

(58) Field of Classification Search
CPC ...... G06N 20/20; G06V 10/98; G06K 9/6256; G06K 9/6261

(Continued)

(56) References Cited

FOREIGN PATENT DOCUMENTS

JP    2002-342739    11/2002

OTHER PUBLICATIONS

Felzenszwalb et al. ("Object Detection with Discriminatively Trained Part-Based Models", IEEE Transactions on Pattern Analysis and Machine Intelligence, Sep. 2010, vol. 32, No. 9, pp. 1627-1645. (Year: 2010).*

(Continued)

*Primary Examiner* — Clifford Hilaire
*Assistant Examiner* — Kristin Dobbs
(74) *Attorney, Agent, or Firm* — Wenderoth, Lind & Ponack, LLP

(57) ABSTRACT

An information processing method includes acquiring a first prediction result by inputting evaluation data to a first model; determining an anomaly in the first prediction result based on the first prediction result and reference information; acquiring a second model based on the determination result; acquiring a second prediction result by inputting the evaluation data to the second model; determining an anomaly in the second prediction result based on the second prediction result and the reference information; acquiring a third model based on the determination result; acquiring a third prediction result by inputting the evaluation data to the third model; determining an anomaly in the third prediction result based on the third prediction result and the reference information; and if the anomaly in the third prediction result is recognized as being identical to the anomaly in the first prediction result, outputting information about a training limit of the first model.

5 Claims, 3 Drawing Sheets

(58) Field of Classification Search
USPC .......................................................... 706/12
See application file for complete search history.

(56) References Cited

OTHER PUBLICATIONS

Qijie Zhao, et al., "M2Det: A Single-Shot Object Detector based on Multi-Level Feature Pyramid Network", [online], arXiv:1811.04533v3[cs.CV], Jan. 6, 2019.

Qijie Zhao, et al., "M2Det: A Single-Shot Object Detector based on Multi-Level Feature Pyramid Network", [online], arXiv:1811.04533v1 [cs.CV], Nov. 12, 2018.

Extended European Search Report dated Dec. 8, 2020 in corresponding European Patent Application No. 20185041.9.

Felzenszwalb et al., "Object Detection with Discriminatively Trained Part-Based Models", IEEE Transactions on Pattern Analysis and Machine Intelligence, Sep. 2010, vol. 32, No. 9, pp. 1627-1645, XP011327422.

\* cited by examiner

INFORMATION PROCESSING METHOD AND INFORMATION PROCESSING SYSTEM

CROSS REFERENCE TO RELATED APPLICATIONS

The present application is based on and claims priority of U.S. Provisional Patent Application No. 62/876,137 filed on Jul. 19, 2019 and Japanese Patent Application No. 2020-033062 filed on Feb. 28, 2020. The entire disclosures of the above-identified applications, including the specifications, drawings and claims are incorporated herein by reference in their entirety.

FIELD

The present disclosure relates to an information processing method to be executed on a computer, and an information processing system for executing the information processing method.

BACKGROUND

Object detection techniques using deep learning (see NPL 1, for example), for which high-precision implementation examples have been reported, are expected to become commercially practical in various applications.

As a countermeasure against anomalies in detection (including false positive detection and false negative detection) in the object detection techniques using machine learning such as deep learning, machine learning-based model training is conducted using training data that includes extra data to be detected with which an anomaly in detection has occurred (see PTL1).

CITATION LIST

Patent Literature

PTL 1: Japanese Unexamined Patent Application Publication No. 2002-342739

Non Patent Literature

NPL 1: "M2Det: A Single-Shot Object Detector based on Multi-Level Feature Pyramid Network" by Qijie Zhao and other six members, November 2018, [online], arXiv, retrieved on Feb. 26, 2020 from Internet <URL: https://arxiv.org/abs/1811.04533>.

SUMMARY

Technical Problem

However, there are cases where an anomaly in detection cannot be eliminated even by training using modified training data. In such a case, it is difficult to determine whether the elimination of an anomaly in detection is possible or not, i.e., whether a training limit has been reached.

The present disclosure provides an information processing method and the like that enable determining the limit of machine learning-based training.

Solution to Problem

An information processing method according to one aspect of the present disclosure is a method to be executed on a computer, and includes acquiring evaluation data; acquiring a first prediction result by inputting the evaluation data to a first model that performs prediction processing; executing a first determination based on the first prediction result and reference information about the evaluation data, the first determination being a determination of an error or an omission included in the first prediction result with respect to the evaluation data; acquiring a second model through first training using machine learning, the first training being conducted using training data that includes at least one of first evaluation data and data similar to the first evaluation data, the first evaluation data being the evaluation data associated with the first prediction result including an error or an omission; acquiring a second prediction result by inputting the evaluation data to the second model; executing a second determination based on the second prediction result and the reference information about the evaluation data, the second determination being a determination of an error or an omission included in the second prediction result with respect to the evaluation data; acquiring a third model through second training using machine learning, the second training being conducted using training data that includes at least one of second evaluation data and data similar to the second evaluation data, the second evaluation data being the evaluation data associated with the second prediction result including an error or an omission that is not included in the first prediction result; acquiring a third prediction result by inputting the evaluation data to the third model; executing a third determination based on the third prediction result and the reference information about the evaluation data, the third determination being a determination of an error or an omission included in the third prediction result with respect to the evaluation data; and when the error or the omission included in the third prediction result is recognized as being identical to the error or the omission included in the first prediction result, outputting information about a training limit of the first model.

An information processing system according to one aspect of the present disclosure includes a prediction processor, an anomaly determiner, a model trainer, and a notification controller. The prediction processor acquires evaluation data and acquires a first prediction result by inputting the evaluation data to a first model that performs prediction processing. The anomaly determiner executes a first determination based on the first prediction result and reference information about the evaluation data, the first determination being a determination of an error or an omission included in the first prediction result with respect to the evaluation data. The model trainer acquires a second model through first training using machine learning, the first training being conducted using training data that includes at least one of first evaluation data and data similar to the first evaluation data, the first evaluation data being the evaluation data associated with the first prediction result including an error or an omission. The prediction processor further acquires a second prediction result by inputting the evaluation data to the second model. The anomaly determiner further executes a second determination based on the second prediction result and the reference information about the evaluation data, the second determination being a determination of an error or an omission included in the second prediction result with respect to the evaluation data. The model trainer further acquires a third model through second training using machine learning, the second training being conducted using training data that includes at least one of second evaluation data and data similar to the second evaluation data, the second evaluation data being the evaluation data associated with the second prediction result including an error or an omission that is not included in the first prediction result. The prediction processor further acquires a third prediction result by inputting the evaluation data to the third model. The anomaly determiner further executes a third determination based on the third prediction result and the reference information about the evaluation data, the third determination being a determination of an error or an omission included in the third prediction result with respect to the evaluation data. When the error or the omission included in the third prediction result is recognized as being identical to the error or the omission included in the first prediction result, the notification controller outputs information about a training limit of the first model.

Note that these comprehensive or specific aspects may be implemented as a device, an integrated circuit, or a computer-readable recording medium such as a CD-ROM, in addition to the above-described method or system, or may be implemented as any combination of a device, a system, an integrated circuit, a method, a computer program, and a recording medium.

Advantageous Effects

With the information processing method and the like according to the present disclosure, it is possible to determine the limit of machine learning-based training.

BRIEF DESCRIPTION OF DRAWINGS

These and other advantages and features will become apparent from the following description thereof taken in conjunction with the accompanying Drawings, by way of non-limiting examples of embodiments disclosed herein.

Figure 1:
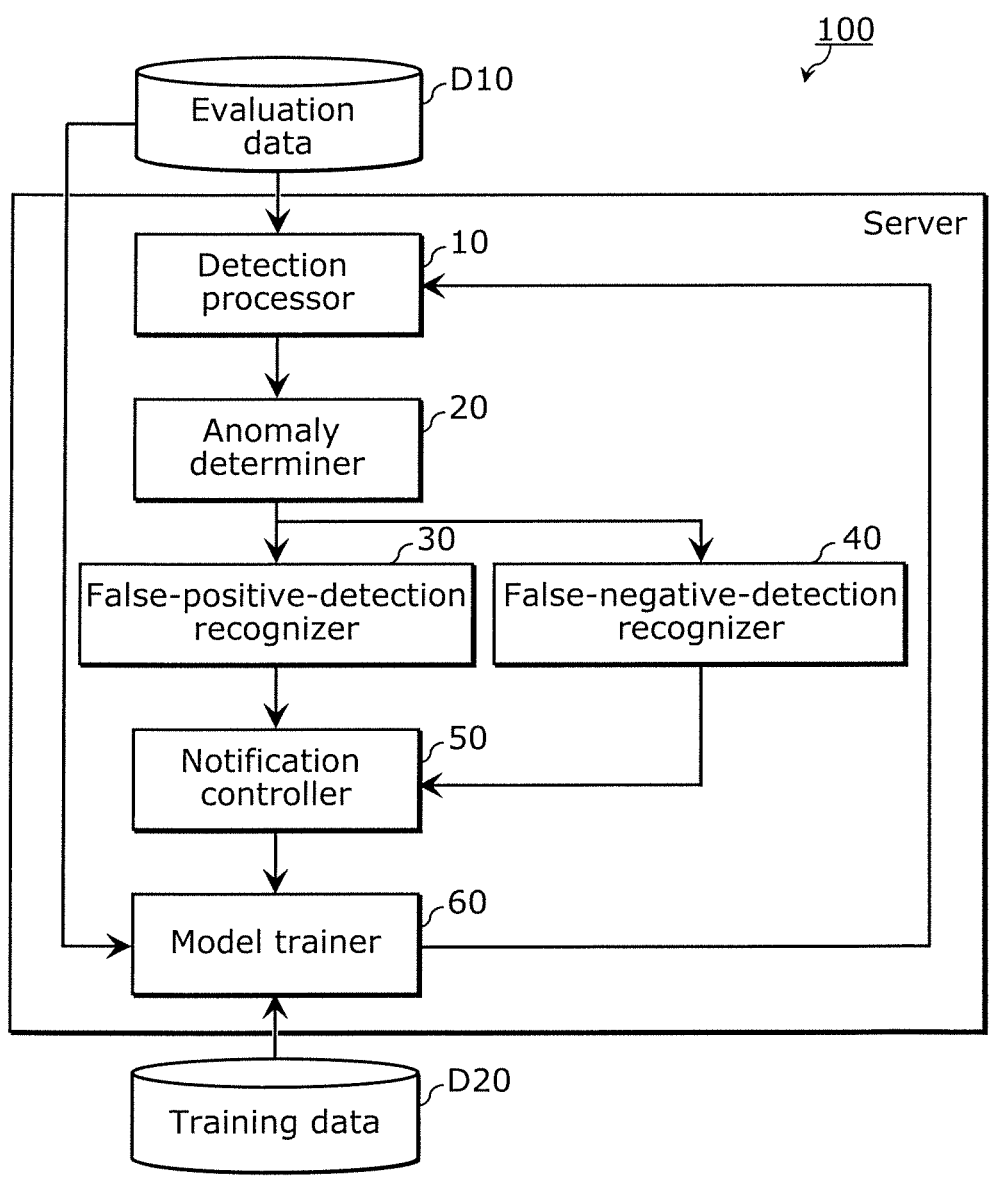
FIG. 1 is a block diagram illustrating a functional configuration example of an information processing system that executes an information processing method according to an embodiment.

Description of Embodiment (Underlying Knowledge Forming Basis of the Present Disclosure)

The inventors of the present disclosure have found the following problems with conventional techniques.

For example in the case of applying object detection techniques to applications such as autonomous driving that require high reliability, taking a countermeasure against anomalies in detection such as false positive detection and false negative detection is indispensable because such anomalies in detection may cause accidents that can threaten human lives.

In object detection techniques using machine learning methods such as deep learning, as a countermeasure against anomalies in detection, in general machine learning-based model training is conducted using training data that includes data to be detected with which an anomaly in detection has occurred. However, even if an observed anomaly in detection has been eliminated from the model obtained as a result of this training, determination as to whether another anomaly in detection has occurred in this model, i.e., whether this training contributes to an overall improvement in the accuracy of object detection using this model or has reached its limit, depends greatly on experimental knowledge or intuition of a person in charge of the model training under present circumstances. For example, there is a possibility that, although a highly experienced person in charge might consider alternatives such as changing the network configuration in order to obtain a more highly accurate object detection model, in reality a little experienced person in charge may choose to conduct further training using modified training data and observe results obtained by a resultant model. In this way, there is the problem that the determination as to the limit of machine learning-based training varies depending on the technical level of a person in charge of the operation.

The information processing method according to one aspect of the present disclosure invented in view of problems as described above is a method to be executed on a computer, and includes acquiring evaluation data; acquiring a first prediction result by inputting the evaluation data to a first model that performs prediction processing; executing a first determination based on the first prediction result and reference information about the evaluation data, the first determination being a determination of an error or an omission included in the first prediction result with respect to the evaluation data; acquiring a second model through first training using machine learning, the first training being conducted using training data that includes at least one of first evaluation data and data similar to the first evaluation data, the first evaluation data being the evaluation data associated with the first prediction result including an error or an omission; acquiring a second prediction result by inputting the evaluation data to the second model; executing a second determination based on the second prediction result and the reference information about the evaluation data, the second determination being a determination of an error or an omission included in the second prediction result with respect to the evaluation data; acquiring a third model through second training using machine learning, the second training being conducted using training data that includes at least one of second evaluation data and data similar to the second evaluation data, the second evaluation data being the evaluation data associated with the second prediction result including an error or an omission that is not included in the first prediction result; acquiring a third prediction result by inputting the evaluation data to the third model; executing a third determination based on the third prediction result and the reference information about the evaluation data, the third determination being a determination of an error or an omission included in the third prediction result with respect to the evaluation data; and when the error or the omission included in the third prediction result is recognized as being identical to the error or the omission included in the first prediction result, outputting information about a training limit of the first model.

Accordingly, the limit of improvement in the performance of a prediction model achieved by machine learning-based training can be determined irrespective of the technical level of a person in charge of creating the prediction model.

The evaluation data may be image data, the prediction processing may be object detection processing, and the first prediction result, the second prediction result, and the third prediction result each may be an object detection result.

That is, the limit of improvement in the performance of a prediction model that performs object detection processing on image data can be determined irrespective of the technical level of a person in charge of model creation.

The object detection result may include a first bounding box that is a bounding box of an object obtained as a result of the object detection processing, the reference information may include a second bounding box that is a bounding box of an object serving as a reference, and the error or the omission may be determined based on the first bounding box and the second bounding box.

In this way, anomalies in object detection can be determined.

The outputting of the information may provide a notification of a possibility that the training limit has been reached, and the notification may be provided via an image or audio.

This give a person in charge of creating a prediction model the materials for considering methods other than extra training based on data that has not been predicted normally, in order to improve the performance of the prediction model, thus contributing to an improvement in operating efficiency.

An information processing system according to one aspect of the present disclosure includes a prediction processor, an anomaly determiner, a model trainer, and a notification controller. The prediction processor acquires evaluation data and acquires a first prediction result by inputting the evaluation data to a first model that performs prediction processing. The anomaly determiner executes a first determination based on the first prediction result and reference information about the evaluation data, the first determination being a determination of an error or an omission included in the first prediction result with respect to the evaluation data. The model trainer acquires a second model through first training using machine learning, the first training being conducted using training data that includes at least one of first evaluation data and data similar to the first evaluation data, the first evaluation data being the evaluation data associated with the first prediction result including an error or an omission. The prediction processor further acquires a second prediction result by inputting the evaluation data to the second model. The anomaly determiner further executes a second determination based on the second prediction result and the reference information about the evaluation data, the second determination being a determination of an error or an omission included in the second prediction result with respect to the evaluation data. The model trainer further acquires a third model through second training using machine learning, the second training being conducted using training data that includes at least one of second evaluation data and data similar to the second evaluation data, the second evaluation data being the evaluation data associated with the second prediction result including an error or an omission that is not included in the first prediction result. The prediction processor further acquires a third prediction result by inputting the evaluation data to the third model. The anomaly determiner further executes a third determination based on the third prediction result and the reference information about the evaluation data, the third determination being a determination of an error or an omission included in the third prediction result with respect to the evaluation data. When the error or the omission included in the third prediction result is recognized as being identical to the error or the omission included in the first prediction result, the notification controller outputs information about a training limit of the first model.

Accordingly, the limit of improvement in the performance of a prediction model achieved by machine learning-based training can be determined irrespective of the technical level of a person in charge of creating the prediction model.

Note that these comprehensive or specific aspects may be implemented as a device, an integrated circuit, or a computer-readable recording medium such as a CD-ROM, in addition to the above-described method or system, or may be implemented as any combination of a device, a system, an integrated circuit, a method, a computer program, and a recording medium.

Hereinafter, embodiment of the information processing method and the information processing system according to one aspect of the present disclosure will be described with reference to the drawings. The embodiment described below shows one specific example of the present disclosure. Thus, numerical values, shapes, components, the arrangement and connection of the components, steps (procedural steps), the order of the steps etc. described in the following embodiment are mere examples and do not intend to limit the present disclosure. Among the components in the following embodiment, those that are not recited in any independent claim are components that may be added arbitrarily. Each drawing is a schematic diagram and does not always provide precise depiction.

Embodiment

An information processing method according to an embodiment is a method to be executed on a computer and for determining a low possibility of improvement in performance through execution of extra training, i.e., determining a substantial limit (hereinafter, also referred to as a training limit), on the basis of anomalies (omissions or errors) included in the result of processing performed by a prediction model obtained through machine learning-based training. The following description takes the example of the case where this information processing method is used to determine a training limit of a prediction model that performs object detection on an image.

1. Configuration

FIG. 1 is a block diagram illustrating a functional configuration example of an information processing system that executes an information processing method according to the present embodiment.

Information processing system 100 according to the present embodiment generates or updates a prediction model through machine learning-based training and evaluates this generated or updated prediction model. Then, on the basis of the result of this evaluation, information processing system 100 determines whether the limit of improvement in performance by training has been reached.

Information processing system 100 includes a server that is configured as one or more computers, each including a processor and a memory, and that executes this information processing method. In the example illustrated in FIG. 1, this server includes detection processor 10, anomaly determiner 20, false-positive-detection recognizer 30, false-negative-detection recognizer 40, notification controller 50, and model trainer 60 as functional components.

Detection processor 10 causes an object detection model that has already undergone machine learning-based training (this model is hereinafter also simply referred to as a trained model) to perform object detection processing for performance evaluation. Detection processor 10 that has acquired evaluation data (in this example, image data) to be used to evaluate the performance of the trained model performs pre-processing on images to be used for the performance evaluation. The pre-processing as used herein refers to processing performed for the preparation of object detection, such as adjusting the resolutions of the images or normalizing pixel values. Upon acquiring the trained model to be evaluated, detection processor 10 inputs each image that has undergone the pre-processing to this trained model, and causes the trained model to output a result of object detection processing, i.e., prediction processing performed by the object detection model (this result is hereinafter, referred to as an "object detection result"). Specifically, the object detection result refers to bounding boxes detected in the image by the object detection model, the bounding boxes surrounding, for example, objects such as pedestrians or obstacles. Information about the acquired bounding boxes is output from detection processor 10 to anomaly determiner 20. This information includes, for example, information for identifying the image on which the object detection processing has been performed, and the ranges (positions and sizes) and probabilities (also referred to as "likelihoods") of the bounding boxes in this image. Detection processor 10 is one example of a prediction processor according to the present embodiment, and the object detection result acquired through the object detection processing by detection processor 10 is an example of a first prediction result, a second prediction result, and a third prediction result according to the present embodiment.

Figure 2:
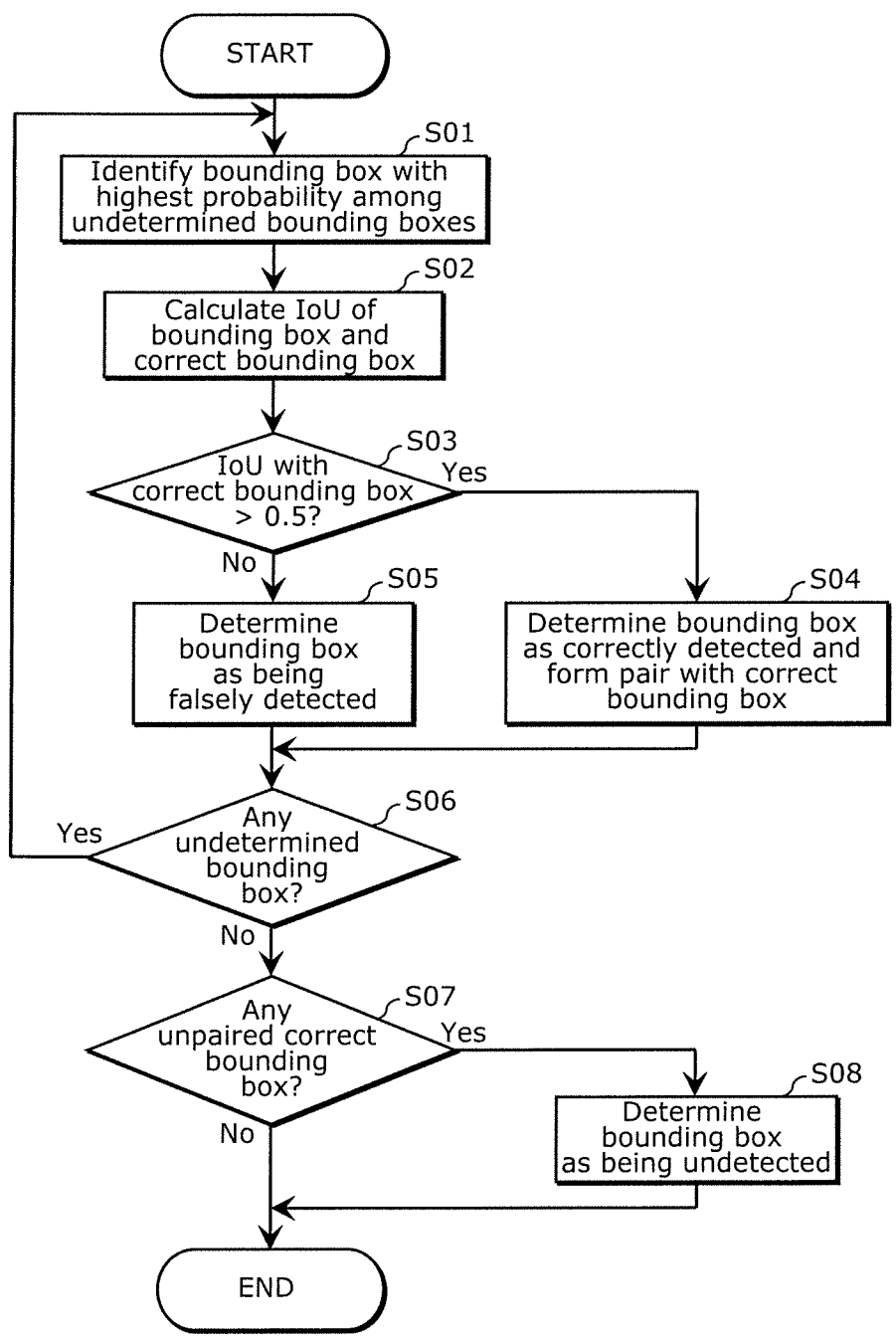
FIG. 2 is a flowchart illustrating an example of the procedure of anomaly determination in the information processing method according to the embodiment.

Anomaly determiner 20 acquires information about bounding boxes that indicate a correct result of the object detection in this image (these bounding boxes are hereinafter also referred to as "correct bounding boxes") as a reference, in addition to the information about bounding boxes input from detection processor 10. Then, anomaly determiner 20 determines anomalies in the object detection result obtained from the trained model, on the basis of the bounding boxes input from detection processor 10 and the bounding boxes indicating the correct result. In this example, the anomalies include false positive detection (errors) and false negative detection (omissions). FIG. 2 is a flowchart illustrating an example of the procedure of the method of determining these anomalies in the object detection result, performed by anomaly determiner 20.

Anomaly determiner 20 makes an anomaly determination in descending order of the probabilities of the bounding boxes acquired in one image indicated by the information input from detection processor 10. First, anomaly determiner 20 identifies a bounding box with a highest probability among bounding boxes for which an anomaly determination has not yet been made (step S01).

Then, anomaly determiner 20 calculates an Intersection over Union (IoU) between the bounding box identified in step S01 and the corresponding correct bounding box in the image (step S02).

Then, anomaly determiner 20 determines whether the IoU of this bounding box with the correct bounding box, calculated in step S02, exceeds 0.5 (step S03). If the IoU of the bounding box with the correct bounding box exceeds 0.5 (Yes in step S03), anomaly determiner 20 determines that this bounding box has been detected correctly, and pairs this bounding box with the correct bounding box with an IoU greater than 0.5 (step S04). If the IoU of the bounding box with the correct bounding box does not exceed 0.5 (No in step S03), anomaly determiner 20 determines that this bounding box has been falsely detected (step S05).

Then, anomaly determiner 20 confirms whether the bounding boxes acquired in this image further include any bounding box that has not yet undergone the series of procedural steps until step S05 (step S06).

If there is any bounding box that has not yet undergone this procedure (Yes in step S06), anomaly determiner 20 returns to step S01.

If all of the bounding boxes acquired in this image have undergone the procedure until step S05 (No in step S06), anomaly determiner 20 confirms whether there is any correct bounding box that has not been paired with any of the bounding boxes in step S04 among the correct bounding boxes in this image in the procedure up to this point (step S07).

If there is any correct bounding box that has not been paired with any of the bounding boxes (Yes in step S07), anomaly determiner 20 determines that this correct bounding box has been undetected (step S08) and ends the series of procedural steps.

If there is no correct bounding box that has not been paired with any of the bounding boxes, i.e., every correct bounding box has been paired with one of the bounding boxes (No in step S07), anomaly determiner 20 ends the series of procedural steps for determining anomalies in the object detection processing performed on this image.

The result of the determination performed by anomaly determiner 20, specifically, information about correctness or incorrectness of each bounding box (hereinafter, also referred to as "false-positive-detection information"), is output to false-positive-detection recognizer 30, and information about false negative detection (hereinafter, also referred to as false-negative-detection information) is output to false-negative-detection recognizer 40. The false-positive-detection information and the false-negative-detection information will be described later.

In the above-described procedure example, in order to simplify the description, a case is assumed in which bounding boxes are acquired for only a single type of objects to be detected. In the case where there are a plurality of types of objects to be detected, step S02 may be performed on bounding boxes and correct bounding boxes for objects of the same type. In this case, for example, information about the type of objects detected is used, this information being further included in each of the information about bounding boxes acquired by anomaly determiner 20 and the information about correct bounding boxes.

The reference value, 0.5, of the IoU in step S03 is a mere example, and this value is also used as an example in the following description. This reference value is set, for example, such that only one of the IoUs calculated between one bounding box and each of a plurality of correct bounding boxes exceeds this reference value. Nevertheless, if a plurality of IoUs exceeds the reference value, for example, a combination of a bounding box and a correct bounding box with a highest IoU may form a pair in step S04. Alternatively, based on the idea that the detection result is ambiguous, this bounding box may be determined as having being falsely detected.

Each bounding box indicated by the information input from detection processor 10 to anomaly determiner 20 is an example of a first bounding box according to the present embodiment. The information about correct bounding boxes acquired by anomaly determiner 20 is an example of reference information according to the present embodiment, and each correct bounding box is an example of a second bounding box. The determination made by anomaly determiner 20 in accordance with the procedure illustrated in FIG. 2 is an example of a first determination, a second determination, and a third determination according to the present embodiment.

False-positive-detection recognizer 30 acquires the false-positive-detection information from anomaly determiner 20 and stores this false-positive-detection information. The false-positive-detection information includes information indicating the details of false positive detection that has occurred, the information including the image on which the object detection has been performed, whether the detection result is correct or not, and the bounding box (hereinafter, also referred to as the "falsely detected bounding box") determined as having being falsely detected in the object detection result. False-positive-detection recognizer 30 determines whether the false positive detection whose details are indicated by the false-positive-detection information newly acquired from anomaly determiner 20 is a re-occurrence of already occurred false positive detection, using the stored false-positive-detection information. As a specific example, false-positive-detection recognizer 30 calculates an IoU between the falsely detected bounding box indicated by the newly acquired false-positive-detection information and each falsely detected bounding box obtained from false positive detection that has occurred in object detection processing performed on the same image by an older object detection model whose performance has already been evaluated. If this IoU exceeds a predetermined reference value (e.g., 0.5), false-positive-detection recognizer 30 recognizes that the false positive detection whose details are indicated by the newly acquired false-positive-detection information is identical to the false positive detection that has occurred with the older object detection model, and determines that this false positive detection is the re-occurrence of the already occurred false positive detection. If this IoU is less than or equal to the predetermined reference value, false-positive-detection recognizer 30 determines that the false positive detection whose details are indicated by the newly acquired false-positive-detection information is not the already occurred false positive detection (i.e., it is new false positive detection). Then, information about the result of this determination is output from false-positive-detection recognizer 30 to notification controller 50. The information about the result of the determination includes, for example, information for identifying the image in which this false positive detection has occurred, in addition to the result of the determination. The information about the result of the determination is passed to model trainer 60, which will be described later, and used to acquire training data that is used in the next execution of machine learning-based training.

False-negative-detection recognizer 40 acquires information about false negative detection from anomaly determiner 20 and stores this false-negative-detection information. The false-negative-detection information includes information indicating the details of false negative detection that has occurred, such as an image that has undergone object detection and correct bounding boxes (hereinafter, also referred to as undetected bounding boxes) determined as having being undetected. False-negative-detection recognizer 40 determines whether the false negative detection whose details are indicated by the false-negative-detection information newly acquired from anomaly determiner 20 is a re-occurrence of already occurred false negative detection, using the stored false-negative-detection information. As a specific example, false-negative-detection recognizer 40 recognizes whether the undetected bounding box indicated by the newly acquired false-negative-detection information is identical to any undetected bounding box in false negative detection that has occurred in object detection processing performed on the same image by an older object detection model whose performance has already been evaluated. If these two undetected bounding boxes are the same, false-negative-detection recognizer 40 determines that the false negative detection whose details are indicated by the newly acquired false-negative-detection information is a re-occurrence of the already occurred false negative detection. If these two undetected bounding boxes are not the same, false-negative-detection recognizer 40 determines that the false negative detection whose details are indicated by the newly acquired false-negative-detection information is not the already occurred false negative detection (i.e., it is new false negative detection). Then, information about the result of this determination is output from false-negative-detection recognizer 40 to notification controller 50. The information about the result of the determination includes, for example, information for identifying the image in which this new false negative detection has occurred, in addition to the result of the determination. The information about the result of the determination is passed to model trainer 60, which will be described later, and used to acquire training data that is used in the next execution of machine learning-based training.

Notification controller 50 determines whether any antinomy has occurred, on the basis of the information about the results of the determination input from false-positive-detection recognizer 30 and false-negative-detection recognizer 40, and transmits a notification indicating the result of this determination to model trainer 60. The antinomy as used herein refers to a situation in which false positive detection or false negative detection once eliminated by machine learning-based training has reoccurred afterword with a trained model acquired through training conducted to eliminate another false positive detection or false negative detection. As a specific example of the notification, if it is determined that antinomy has occurred, notification controller 50 notifies the user of information processing system 100, i.e., a person in charge of creating the object detection model, that a training limit has been reached, as information about the training limit. As the information about the training limit, the detection result (bounding box) associated with the antinomy determined as having occurred may be output. This notification is provided, for example, via an image displayed on a display device (not shown) connected to the computer constituting the server in FIG. 1. If it is determined that no antinomies have occurred, notification controller 50 may notify the user that the training has ended normally. These notifications may be provided via audio output from a speaker (not shown) connected to the computer constituting the server in FIG. 1. If it is determined that no antinomies have occurred, notification controller 50 outputs the information about new false positive detection that is input from false-positive-detection recognizer 30 or the information about new false negative detection that is input from false-negative-detection recognizer 40 to model trainer 60.

Model trainer 60 conducts machine learning-based training to acquire an object detection model whose performance is to be evaluated. Upon receiving an input of the information about new false positive detection from notification controller 50, model trainer 60 acquires training data that is used in training for eliminating this false positive detection, from training data D20. The training data to be used in the training for eliminating false positive detection is, for example, data of an image in which this new false positive detection identified by the information about the new false positive detection has occurred. Upon receiving an input of the information about new false negative detection from notification controller 50, model trainer 60 acquires training data that is used in training for eliminating this false negative detection, from training data D20. The training data to be used in the training for eliminating false negative detection is, for example, data of an image in which this new false negative detection identified by the information about new false negative detection has occurred. That is, the data derived from evaluation data D10 is used, in addition to training data D20, in the machine learning-based training.

Alternatively, data of an image similar to the image in which the new false positive detection has occurred may be used as training data to be used in the training for eliminating the false positive detection. Similarly, data of an image similar to the image in which the new false negative detection has occurred may be used as training data to be used in the training for eliminating the false negative detection. A similar image as used herein refers to, for example, an image that is identical or nearly identical in composition to the original image and that is captured by changing an image-capture setting such as exposure or a shutter speed. Other examples of a similar image include a noise-added image or a noise-reduced image obtained through image processing performed on the original image, and an image obtained by changing, for example, brightness, contrast, color saturation, or white balance.

In order to conduct machine learning-based training, model trainer 60 prepares a data set that is obtained by combining the acquired training data described above and the training data used in the training for obtaining the trained model with which the false positive detection or false negative detection has occurred. Then, using this data set, model trainer 60 conducts machine learning-based training of an object detection model with a predetermined configuration. When the training is completed, model trainer 60 outputs a new trained model.

These functional components are implemented by the processor executing the programs stored in the memory and storing data in the memory as necessary or reading out data stored in the memory in the computer constituting the server.

In the example of information processing system 100 illustrated in FIG. 1, evaluation data D10 and training data D20 are input from the outside of the server into the server, but at least one of the data may be kept inside the server.

2. Operations

Figure 3:
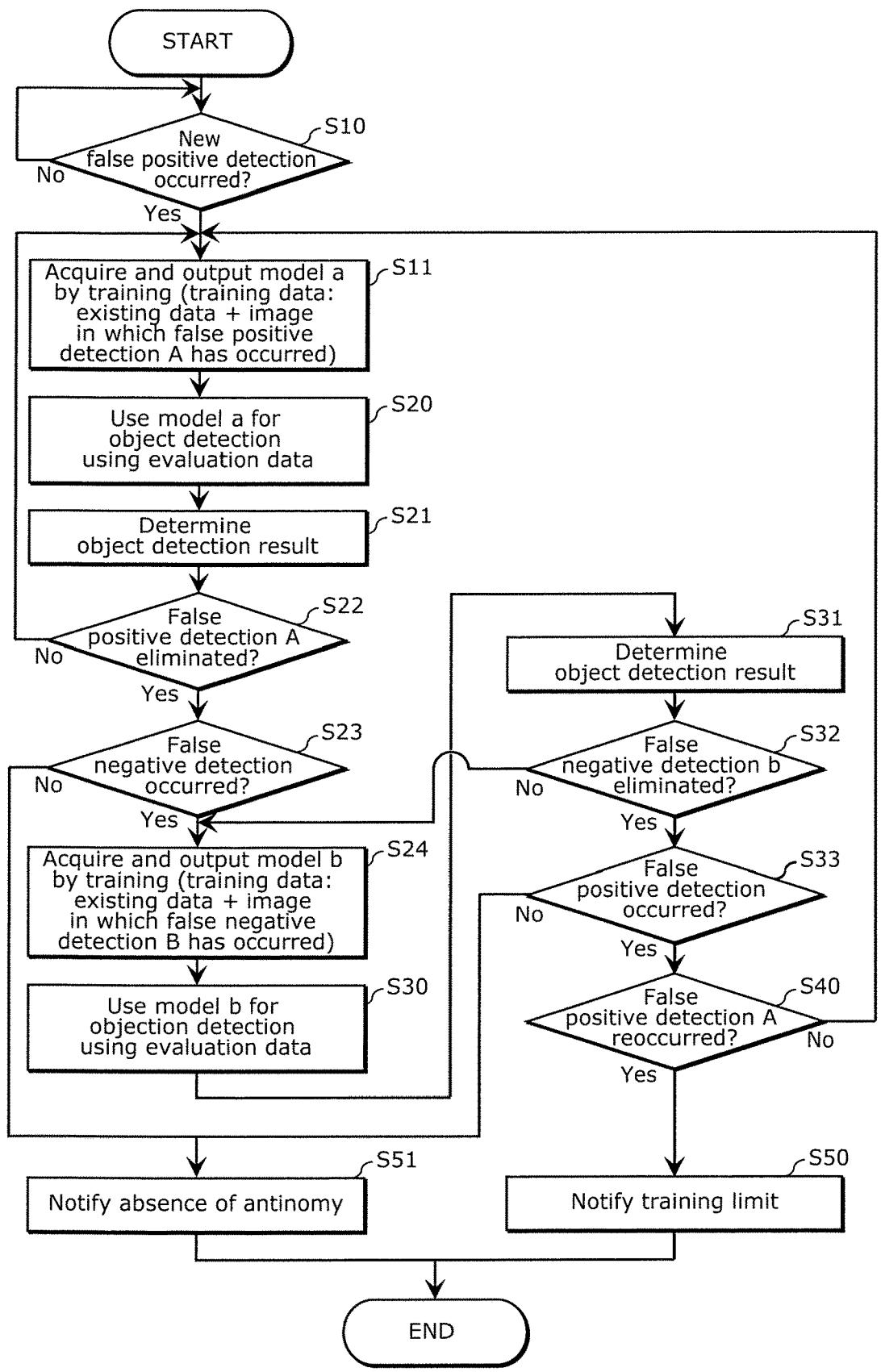
FIG. 3 is a flowchart illustrating an example of the procedure of the information processing method according to the embodiment.

The next description is given of an information processing method executed by information processing system 100 with the above-described configuration. With this information processing method, the performance of a prediction model generated or updated through machine learning-based training is evaluated, and it is determined, on the basis of the result of this evaluation, whether this is the limit of improvement in performance by training. FIG. 3 is a flowchart illustrating an example of the procedure of this information processing method. In order to easily grasp the outline of this information processing method, part of the procedure will be simplified, or an overview of the procedure will be first described along a given assumed situation and supplementary description will be given later. What is illustrated in FIG. 3 is, in the process of operations for improving the accuracy of an object detection model, a procedure performed after image data for evaluation has been input to a trained model to acquire an object detection result, and on the basis of this object detection result and reference information about the image data for evaluation, anomaly determiner 20 has obtained a result of anomaly determination (see FIG. 2). Here, the trained object detection model that has received input of the evaluation data and performed object detection before the procedure illustrated in FIG. 3 is an example of a first model according to the present embodiment, the object detection result output from this object detection model is an example of a first prediction result, and the anomaly determination made by anomaly determiner 20 using this object detection result is an example of a first determination.

False-positive-detection recognizer 30 that has received false-positive-detection information in the result of this first determination from anomaly determiner 20 checks this false-positive-detection information against false-positive-detection information received and stored in the past, and determines whether new false positive detection has occurred in the object detection processing performed for the evaluation of the first model (step S10). This information processing method does not proceed to the next procedural step while new false positive detection does not occur (No in step S10),. That is, during the recurrence of false positive detection that is recognized as being identical to past false positive detection, the operation of eliminating that false positive detection is performed, for example.

If new false positive detection has occurred (Yes in step S10), this information processing method proceeds to step S11. In step S11, model trainer 60 that has received information about the result of this determination from false-positive-detection recognizer 30 via notification controller 50 acquires a new object detection model through machine learning-based training. This training uses, as training data, the existing training data used in the training of the object detection model with which the aforementioned new false positive detection has occurred (this new detection is referred to as "false positive detection A" for conveniences' sake) and at least one of data of an image in which false positive detection A has occurred, i.e., evaluation data, and data of an image similar to this image. The object detection model acquired in step S11 is hereinafter referred to as model a for conveniences' sake. The aforementioned training conducted by model trainer 60 in step S11 is an example of a first training according to the present embodiment, and model a is an example of a second model according to the present embodiment. In the image data input as the evaluation data to model a, data of the image in which an error has occurred in detection, i.e., the image in which false positive detection A has occurred, is an example of first evaluation data according to the present embodiment.

Then, detection processor 10 inputs data of the image, i.e., the evaluation data, to model a and acquires an object detection result that is the outputting of model a upon this input (step S20). The object detection result output from model a is an example of a second prediction result according to the present embodiment.

Then, anomaly determiner 20 makes an anomaly determination, whose procedure is illustrated in FIG. 2, on the basis of the reference information about the evaluation data input to model a in step S20 and the object detection result output from model a upon this input (step S21). This anomaly determination made in step S21 is an example of a second determination according to the present embodiment.

Then, false-positive-detection recognizer 30 that has received false-positive-detection information in the result of this second determination from anomaly determiner 20 checks this false-positive-detection information against false-positive-detection information received and stored in the past, and recognizes whether this false-positive-detection information is identical to false positive detection A, i.e., confirms whether false positive detection A has been eliminated (step S22). If false positive detection A has not been eliminated (No in step S22), the procedure is performed over again from step S11. In this case, step S11 may be performed by, for example, changing the training data to be used or hyperparameters to be used in the machine learning-based training, such as batch size, number of iterations, and number of epochs, from those used in the execution of the previous step S11.

If false positive detection A has been eliminated (Yes in step S22), false-negative-detection recognizer 40 that has received false-negative-detection information in the result of the second determination from anomaly determiner 20 checks this false-negative-detection information against false-negative-detection information received and stored in the past, and determines whether new false negative detection has occurred in the object detection processing performed for evaluation of model a (step S23). If new false negative detection has occurred (Yes in step S23), information about the result of this determination is passed from false-negative-detection recognizer 40 to model trainer 60 via notification controller 50. Model trainer 60 further acquires a new object detection model through machine learning-based training (step S24). This training uses, as training data, the existing training data used in the training of model a in step S11 and at least one of data of the image in which new false negative detection has occurred, i.e., evaluation data, (this new false negative detection is hereinafter referred to as "false negative detection B" for conveniences' sake) and data of an image similar to this image. The object detection model acquired in step S24 is hereinafter referred to as model b for conveniences' sake. The aforementioned training conducted by model trainer 60 in step S24 is an example of a second training according to the present embodiment, and model b is an example of a third model according to the present embodiment. In the image data input as the evaluation data to model b, data of the image in which an omission has occurred in detection, i.e., the image in which false negative detection B has occurred, is an example of second evaluation data according to the present embodiment.

Then, detection processor 10 inputs the data of the image, i.e., the evaluation data, to model b and acquires an object detection result that is output from model b upon this input (step S30). The object detection result output from model b is an example of a third prediction result according to the present embodiment.

Then, anomaly determiner 20 makes an anomaly determination, whose procedure is illustrated in FIG. 2, on the basis of the reference information about the evaluation data input to model b in step S30 and the object detection result output from model b upon this input (step S31). This anomaly determination made in step S31 is an example of a third determination according to the present embodiment.

Then, false-negative-detection recognizer 40 that has received false-negative-detection information in the result of this third determination from anomaly determiner 20 checks this false-negative-detection information against false-negative-detection information received and stored in the past, and confirms whether false negative detection B has been eliminated (step S32). If false negative detection B has not been eliminated (No in step S32), the procedure is performed over again from step S24. In this case, step S24 may be performed by, for example, changing the training data to be used or hyperparameters to be used in the machine learning-based training, such as batch size, number of iterations, and number of epochs, from those used in the execution of the previous step S24.

If false negative detection B has been eliminated (Yes in step S32), false-positive-detection recognizer 30 that has received false-positive-detection information in the result of the third determination from anomaly determiner 20 determines whether false positive detection has occurred, on the basis of this false-positive-detection information (step S33). If false positive detection has occurred (Yes in step S33), false-positive-detection recognizer 30 checks this false positive detection against false-positive-detection information received and stored in the past, and further determine whether this false positive detection occurring with model b is a re-occurrence of false positive detection A that has been eliminated once (step S40). The result of the determination in step S40 is input to notification controller 50. If this is the recurrence of false positive detection A (Yes in step S40), notification controller 50 outputs information about a training limit, e.g., outputs predetermined data indicating this information to a display device or a speaker, so as to notify the person in charge of creating the object detection model of this information (step S50). The information about a training limit indicates, for example, the possibility of the training limit being reached. The person in charge who has received such a notification is able to know that the challenging improvement in the performance of a model through machine learning-based training has reached its limit.

In the example in FIG. 3, in the case where false positive detection A has been eliminated from model a obtained through subsequent training (Yes in step S22) and false negative detection has not occurred with model a (No in step S23), the user is notified of the absence of antinomy (step S51). Similarly, in the case where false negative detection B occurring with model a has been once eliminated from model b obtained through subsequent training (Yes in step S32) and false positive detection has not occurred with model b (No in step S33), the user is notified of the absence of antinomy or of the fact that a training limit has not yet been reached (step S51).

Note that the above-described procedure is a mere example, and the content of processing performed in the information processing method according to the present embodiment is not limited to this example. For example, in the above-described example, in the case where false negative detection B, which has occurred after the elimination of previously occurring false positive detection A, has been eliminated, it is determined that a training limit is reached, on the condition of the occurrence of an event in which once eliminated false positive detection A has reoccurred. The content of the event that can be used in this way as a condition of determining the arrival of a training limit is not limited thereto, and this event may be the presence of antinomy that a plurality of anomalies cannot be eliminated at the same time. For example, in the above-described example, false positive detection and false negative detection may be replaced, and the arrival of a training limit may be determined upon the occurrence of an event in which, in the case where false positive detection having occurred after elimination of previously occurring false negative detection has been eliminated, the already eliminated false negative detection has reoccurred. Alternatively, the content of the antinomy as a condition of determining the arrival of a training limit may be the occurrence of an event in which there is a plurality of falsely detected anomalies that cannot be eliminated at the same time, or an event in which there is a plurality of undetected anomalies that cannot be eliminated at the same time.

Variations and Other Supplemental Remarks

The information processing method according to one or more aspects of the present disclosure is not limited to the description of the above embodiment. Various modifications conceivable by those skilled in the art can be made to the above-described embodiment and included in the scope of the present disclosure without departing from the gist of the present disclosure. The following description is given of examples of such variations and other supplemental remarks about the description of the embodiment.

(1) In the description of the above embodiment, an IoU is used as a scale to evaluate whether the object detection result output from the object detection model is false positive detection, but the method for evaluating the object detection result is not limited thereto. Aside from the IoU, examples of the evaluation scale that is usable in the information processing method according to the present disclosure and acquired based on the bounding box and the correct bounding box include precision (also referred to as a "relevance ratio" and used for the evaluation of errors), recall (also referred to as a "recall ratio" and used for the evaluation of omissions), and f-value (used for the evaluation of errors and omissions).

(2) In the description of the above embodiment, the output of data for use in the reproduction of a notification via a display device or a speaker from notification controller 50 is an example of one form of the output from information processing system 100, and may take any other form. For example, this output may be an output of data for storage as a log of machine learning-based training performed by information processing system 100 in an internal storage device (not shown) of information processing system 100 or an external storage device (not shown) outside information processing system 100. As another example, this output may be an output of data to be processed or referenced in some sort of information processing performed inside or outside information processing system 100. For example, this data may be used in information processing for determining hyperparameters used to create a prediction model.

(3) In the above-described embodiment, the machine learning-based training conducted to obtain model a in step S11 and model b in step S24 may be training that uses all the training data and creates each model from the beginning. In this case, the first model, the second model, and the third model are each acquired as an independent model. Alternatively, the above machine learning-based training may be training that is additionally conducted on the existing model, using modified training data. Turning now more specifically to the latter with reference to the example illustrated in FIG. 3, in order to obtain model b in step S24, additional training is conducted on model a, using at least one of data of an image in which false negative detection has occurred in object detection using model a and data of an image similar to this image. In this case, the second model is acquired by updating the first model, and the third model is acquired by updating the second model.

(4) In the above-described embodiment, the occurrence of antinomy is described taking the example of the case where a given anomaly (false negative detection or false positive detection) has been once eliminated and then reoccurred with another anomaly (false negative detection or false positive detection) occurring in between. However, the number of anomalies that may occur in between the reoccurring anomalies is not limited to one. For example, in the case of iterations of a cycle including machine learning-based training, object detection, and anomaly determination of the object detection result that are conducted to obtain a given desired model, information about the content of anomalies that have occurred in each cycle is stored and used to check against each anomaly that has occurred in each cycle. As a result of this check, a case in which the content of anomalies that have occurred in the latest cycle is recognized as being identical to the content of anomalies that have occurred in any of the past cycles may also be included in the antinomy according to the present disclosure. In this sense, the first prediction result, the second prediction result, and the third prediction result according to the present disclosure may be any of the results acquired in this order on the time base of iterations of the aforementioned cycle, and are not limited to successively obtained results.

(5) The above embodiment is described taking the example of a prediction model that performs object detection on image data, but data to be processed by a prediction model is not limited to image data. Aside from image data, sensor data may be used, specific examples of which include audio, distance point group, pressure, temperature, humidity, and smell, or data other than sensor data, such as language data, may be used. The prediction model may be configured to, upon receiving an input of the above data, output the result of voice recognition, speaker recognition, or literary style analysis, for example.

(6) Some or all of the functional components included in each of the aforementioned information processing systems may be made up of a single system large-scale integrated circuit (LSI). The system LSI is a ultra-multifunctional LSI manufactured by integrating a plurality of component parts on a single chip, and is specifically a computer system that includes, for example, a microprocessor, a read-only memory (ROM), and a random-access memory (RAM). The ROM stores computer programs. The system LSI implements the function of each component as a result of the microprocessor operating in accordance with these computer programs.

Although the system LSI is described here as an example, it may also be referred to as an IC, an LSI, a super LSI, or an ultra LSI depending on the degree of integration. The method of circuit integration is not limited to the one using an LSI, and may be implemented by using a dedicated circuit or a general-purpose processor. Circuit integration may also use a field programmable gate array (FPGA) that enables programming after manufacture of an LSI, or a reconfigurable processor capable of reconfiguring connections and settings of circuit cells inside an LSI.

Moreover, if other circuit integration techniques that replace LSIs make their debuts with the advance of semiconductor technology or with derivation from another technology, such techniques may be used to integrate the functional blocks. The application of biotechnology is, for example, possible.

(7) One aspect of the present disclosure is not limited to the information processing method described above with reference to the flowcharts in FIGS. 2 and 3, and may be an information processing system that includes a computer and programs to be executed on the computer. One aspect of the present disclosure may also be a non-transitory computer-readable recording medium on which such computer programs are recorded.

Although the present invention has been described and illustrated in detail, it is clearly understood that the same is by way of example only and is not to be taken by way of limitation, the scope of the present invention being limited only by the terms of the appended claims.

Industrial Applicability

The information processing method and the like according to the present disclosure is applicable to the development of models whose performance is improved through machine learning-based training.

The invention claimed is:
1. An information processing method to be executed on a computer, the method comprising:
acquiring evaluation data;

acquiring a first prediction result by inputting the evaluation data to a first model that performs prediction processing;

executing a first determination based on the first prediction result and reference information about the evaluation data, the first determination being a determination of an error or an omission included in the first prediction result with respect to the evaluation data;

acquiring a second model through first training using machine learning, the first training being conducted using training data that includes at least one of first evaluation data and data similar to the first evaluation data, the first evaluation data being the evaluation data associated with the first prediction result including an error or an omission;

acquiring a second prediction result by inputting the evaluation data to the second model;

executing a second determination based on the second prediction result and the reference information about the evaluation data, the second determination being a determination of an error or an omission included in the second prediction result with respect to the evaluation data;

acquiring a third model through second training using machine learning, the second training being conducted using training data that includes at least one of second evaluation data and data similar to the second evaluation data, the second evaluation data being the evaluation data associated with the second prediction result including an error or an omission that is not included in the first prediction result;

acquiring a third prediction result by inputting the evaluation data to the third model;

executing a third determination based on the third prediction result and the reference information about the evaluation data, the third determination being a determination of an error or an omission included in the third prediction result with respect to the evaluation data; and when the error or the omission included in the third prediction result is recognized as being identical to the error or the omission included in the first prediction result, outputting information about a training limit of the first model.

2. The information processing method according to claim 1, wherein the evaluation data is image data, the prediction processing is object detection processing, and the first prediction result, the second prediction result, and the third prediction result are each an object detection result.

3. The information processing method according to claim 2, wherein the object detection result includes a first bounding box that is a bounding box of an object obtained as a result of the object detection processing, the reference information includes a second bounding box that is a bounding box of an object serving as a reference, and the error or the omission is determined based on the first bounding box and the second bounding box.

4. The information processing method according to claim 1, wherein the outputting of the information provides a notification of a possibility that the training limit has been reached, and the notification is provided via an image or audio.

5. An information processing system comprising:

a prediction processor;

an anomaly determiner;

a model trainer; and a notification controller, wherein the prediction processor acquires evaluation data and acquires a first prediction result by inputting the evaluation data to a first model that performs prediction processing, the anomaly determiner executes a first determination based on the first prediction result and reference information about the evaluation data, the first determination being a determination of an error or an omission included in the first prediction result with respect to the evaluation data, the model trainer acquires a second model through first training using machine learning, the first training being conducted using training data that includes at least one of first evaluation data and data similar to the first evaluation data, the first evaluation data being the evaluation data associated with the first prediction result including an error or an omission, the prediction processor further acquires a second prediction result by inputting the evaluation data to the second model, the anomaly determiner further executes a second determination based on the second prediction result and the reference information about the evaluation data, the second determination being a determination of an error or an omission included in the second prediction result with respect to the evaluation data, the model trainer further acquires a third model through second training using machine learning, the second training being conducted using training data that includes at least one of second evaluation data and data similar to the second evaluation data, the second evaluation data being the evaluation data associated with the second prediction result including an error or an omission that is not included in the first prediction result, the prediction processor further acquires a third prediction result by inputting the evaluation data to the third model, the anomaly determiner further executes a third determination based on the third prediction result and the reference information about the evaluation data, the third determination being a determination of an error or an omission included in the third prediction result with respect to the evaluation data, and when the error or the omission included in the third prediction result is recognized as being identical to the error or the omission included in the first prediction result, the notification controller outputs information about a training limit of the first model.

* * * * *